United States Patent [19]
Ando et al.

[11] 3,805,757
[45] Apr. 23, 1974

[54] EXHAUST GAS CLEANING DEVICE FOR INTERNAL COMBUSTION ENGINES

[75] Inventors: Noriyoshi Ando; Noboru Yamamoto; Hiroshi Yoshida, all of Kariya, Japan

[73] Assignee: Nippondenso Co., Ltd., Kariya-shi, Aichi-ken, Japan

[22] Filed: June 20, 1972

[21] Appl. No.: 264,591

[30] Foreign Application Priority Data
June 29, 1971 Japan.............................. 46-47552

[52] U.S. Cl............................. 123/136, 123/122 D
[51] Int. Cl........................................... F02m 31/08
[58] Field of Search............. 123/122 R, 122 D, 136

[56] References Cited
UNITED STATES PATENTS

| | | | |
|---|---|---|---|
| 1,933,365 | 10/1933 | Chandler et al. | 123/122 D |
| 3,444,847 | 5/1969 | King | 123/122 D |
| 3,477,238 | 11/1969 | Race | 123/136 |
| 3,672,342 | 6/1972 | Ojala | 123/122 D |
| 3,441,011 | 4/1969 | Karl | 123/122 D |
| 3,494,341 | 2/1970 | Serruys | 123/122 D |
| 2,773,492 | 12/1956 | Klemm, Jr. | 123/136 |

Primary Examiner—Laurence M. Goodridge
Attorney, Agent, or Firm—Cushman, Darby & Cushman

[57] ABSTRACT

An exhaust gas cleaning device for internal combustion engines, having cooling means and a directional control valve which are actuated only when the temperature of the carburetor or the temperature of a portion correlative with said carburetor temperature rises above a set value, said cooling means cooling the carburetor and fuel supplied to said carburetor thereby to prevent the carburetor from becoming heated by the heat radiating from and transmitted thereto from the engine and by the hot air from the radiator during the low speed operation and idling phases of the engine, and concurrently said directional control valve leading air to the carburetor from the outside of the engine room thereby to prevent wasteful evaporation of fuel within the carburetor, whereby an increase of the carbon monoxide concentration in the exhaust gas is prevented.

2 Claims, 8 Drawing Figures

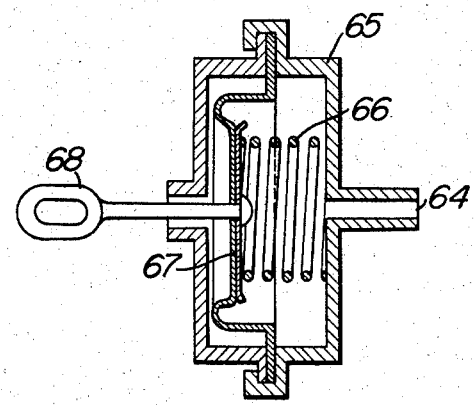
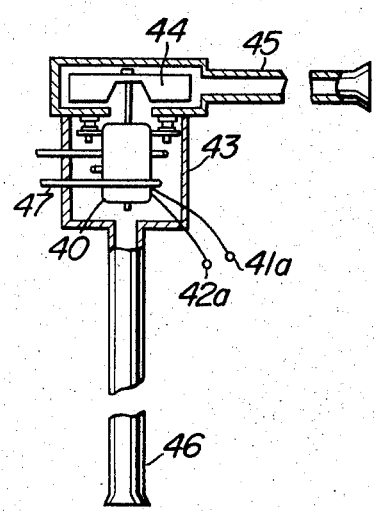
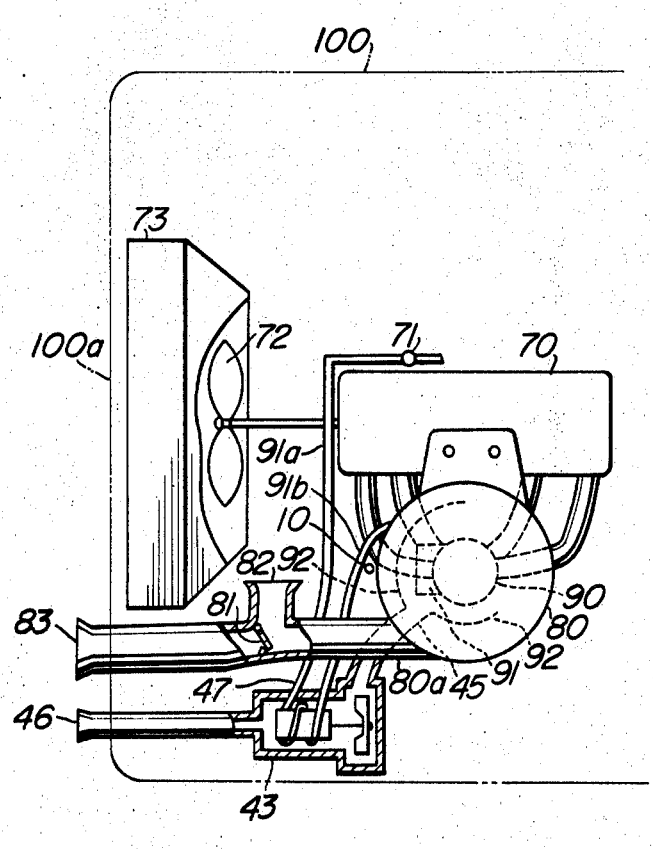

EXHAUST GAS CLEANING DEVICE FOR INTERNAL COMBUSTION ENGINES

BACKGROUND OF THE INVENTION

1. Field of the Invention

This invention relates to an exhaust gas cleaning device for internal combustion engines, particularly for internal combustion engines mounted on vehicles, which prevents an increase of carbon monoxide and other noxious gases in the exhaust gas from the engine, otherwise occurring due to the temperature of the carburetor becoming high when the internal temperature of the engine room rises and accordingly the temperature of engine cooling water rises and the quantity of air flowing into the engine room from the front side of the vehicle decreases.

2. Description of the Prior Art

In the past, following three methods have been employed for decreasing the unburned noxious gases, mainly carbon monoxide gas, in the exhaust gas from the engine when the engine is in its idling phase:

1. A method in which the mixture is made lean or the quantity of fuel supplied to the carburetor is decreases upon adjusting an idle adjusting screw provided in an idle port of the carburetor, thereby to decrease the carbon monoxide contained in the exhaust gas.
2. A method in which the exhaust gas is passed through a catalyst, thereby to oxide the carbon monoxide in the exhaust gas into innoxious gas.
3. A method in which the mixture is reburned with secondary air injected into the exhaust pipe and mixed with the exhaust gas, thereby to render the carbon monoxide component in the exhaust gas innoxious.

However, the method (1) described above has the disadvantage that, while the unburned noxious components in the exhaust gas decrease, the output torque of the engine concurrently decreases, making a smooth idling operation of the engine impossible particularly in a cold weather and resulting in the so-called engine stop. It has the additional disadvantage that, when the temperature of the carburetor rises with the internal temperature of the engine room elevating, the fuel (gasoline) evaporating in the float chamber of the carburetor is sucked into the suction manifold of the engine through an air vent tube communicating said float chamber with the downstream side of the air cleaner, which unnecessarily enriches the mixture and, therefore, the unburned noxious components in the exhaust gas increase even through the idle adjusting screw is set as stated above.

The method (2) described above has the disadvantages that the entire cleaning device becomes expensive since platinum or other expensive metal is used for the catalyst, and that the use of the catalyst for an extended period of time results in degradation of the catalytic activity inherent to said catalyst as a result of being contaminated with the water, carbon, lead, etc. present in the exhaust gas.

The method (3) described above has the disadvantage that a vessel connected to the exhaust pipe, in which the recombustion of the mixture takes place, is subjected to thermal deterioration and poor in durability.

For decreasing the carbon monoxide in the exhaust gas, there has also been proposed a method in which an air inlet communicating with the atmosphere is provided in the wall of the suction manifold of the engine at a location downstream of a throttle valve provided in said suction manifold, which is normally closed, and when the internal temperature of the engine room rises, said air inlet is opened by bimetallic means to a degree according to said internal temperature of the engine room, thereby to dilute the excessively enriched mixture and prevent an increase of carbon monoxide in the exhaust gas. However, such a prior art method, as is well known, has the disadvantages that the bimetals vary considerably from one another in amount of deflection and that the amount of deflection of a given bimetal changes largely with time, and an attempt to eliminate such disadvantages is accompanied by substantial additional disadvantage of this prior art method is that, if the bimetal is set such that the air inlet is opened only when the internal temperature of the engine room has reached a predetermined level, while the disadvantage resulting from the irregularity of the bimetals can be eliminated to some degree, said air inlet will be abruptly at the point when said predetermined temperature has been reached, which will bring about the following undesirable phenomenon: Namely, the commercial gasolines for use in vehicles, as is well known, each consist of a plurality of gasolines of different boiling points mixed at a certain ratio. Therefore, such a gasoline does not have a fixed boiling point as does other liquids such, for example, as water and alcohols, but a continuous boiling point ranging from about 30° to about 200°C. When such a gasoline is used, the mixture becomes excessively enriched and hence the carbon monoxide concentration in the exhaust gas increases until the internal temperature of the engine room rises and reaches the predetermined level at which the aforesaid air inlet is to be opened, and conversely becomes excessively lean when said air inlet is opened when the engine room internal temperature reaches said predetermined level, resulting in stoppage of the engine.

SUMMARY OF THE INVENTION

For eliminating the above-described disadvantages, the present invention has for its object the provision of an exhaust gas cleaning device for internal combustion engines, which has cooling means and a directional control valve which are actuated only when the temperature of the carburetor or the temperature of a portion correlative to said carburetor temperature has reached above a set value, said cooling means cooling the carburetor and fuel supplied to said carburetor thereby to prevent said carburetor being heated by the heat radiating from and transmitted thereto from the engine and by the hot air from the radiator during the low speed operation and idling phases of the engine, and said directional control valve concurrently leading air to the carburetor from the outside of the engine room thereby to prevent wasteful evaporation of the fuel in the carburetor, whereby an increase of carbon monoxide in the exhaust gas is prevented.

Another object of the invention is to provide an exhaust gas cleaning device for internal combustion engines of the character described above, in which there are provided a detector for detecting the temperature of the carburetor or the temperature of the portion correlative to said carburetor temperature and a detector for detecting the vehicle speed or the rate of rotation of the engine mounted on said vehicle, so that said cooling means and said directional control valve may be actuated just as required and not unnecessarily.

According to the present invention, as described above, the cooling means is actuated and the directional control valve is concurrently actuated only when the temperature of the carburetor or the temperature of a portion correlative with said carburetor temperature has reached the predetermined value, to cool the carburetor and the fuel supplied to said carburetor and to supply cold air to the carburetor from the outside of the engine room. Therefore, by employing the device of this invention it is possible to prevent an increase of carbon monoxide in the exhaust gas and to limit the concentration of carbon monoxide always below a prescribed level when the engine is in its low speed operation and idling phases, which would otherwise occur as a result of the carburetor being heated by the heat radiating from and transmitted to the carburetor from the engine and by the hot air from the engine room, and this is a great contribution to the prevention of atmospheric air pollution.

Furthermore, according to the invention the cooling means and the directional control valve are actuated only when the temperature of the carburetor or the temperature of a portion correlative with said carburetor temperature has reached the set value and also the vehicle speed or the rate of rotation of the engine is below a set value (including the case when said vehicle speed is 0 km/h and said engine speed is 0 r.p.m.). This is highly advantageous in preventing excessive discharge of a battery and preventing stoppage of the engine in a cold weather, since the cooling means and directional control valve are actuated just as required and not unnecessarily.

BRIEF DESCRIPTION OF THE DRAWINGS

The accompanying drawings show an embodiment of the cleaning device for internal combustion engines, according to the present invention, in which:

FIG. 6 is a fragmentary vertical sectional view showing the diaphragm means;

FIG. 7 is a fragmentary vertical sectional view showing the electrically operated fan means; and FIG. 8 is a plan view diagrammatically showing the device of this invention as mounted in the engine room.

DESCRIPTION OF THE PREFERRED EMBODIMENT

Figure 1:
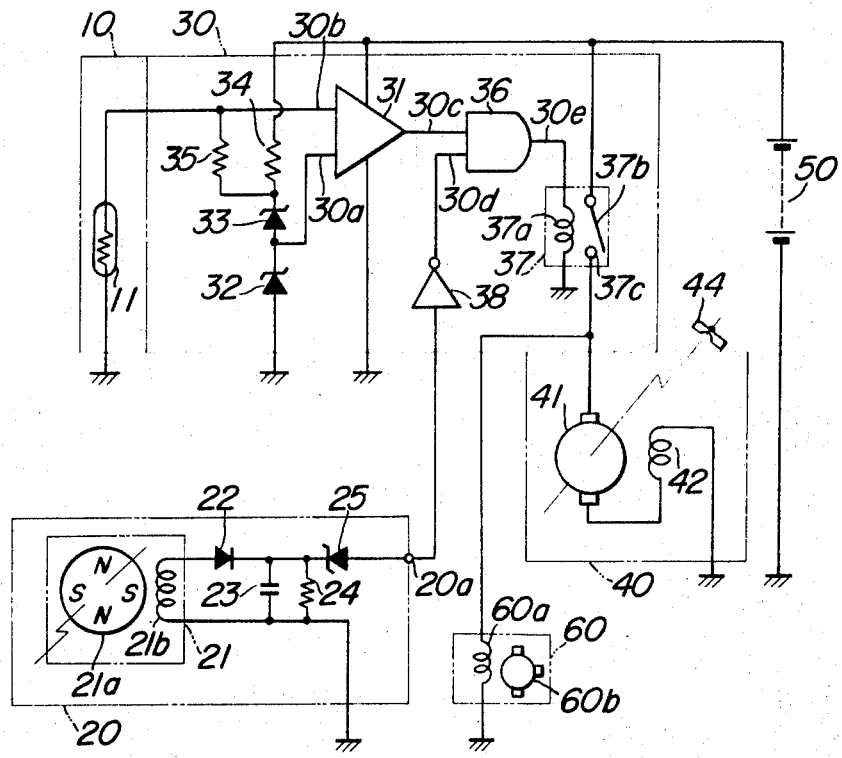
FIG. 1 is an electrical connection diagram showing the entire electric circuit of the device.

The present invention will be described hereunder with reference to the embodiment illustrated in the drawings.

Referring first to FIG. 1, numeral 10 designates a temperature sensor disposed in the engine room for sensing the ambient temperature of the carburetor not shown and 11 designates a thermistor which is a constituent of said temperature sensor. Numeral 30 generally designates a control circuit; 31 a comparator amplifier; 30a, 30b input terminals respectively; and 30c an output terminal at which a high level output voltage appears only when the input voltage at the terminal 30b is lower than that at the other input terminal 30a. Numeral 34 designates a resistor; 33 and 32 Zener diodes which constitute a constant voltage circuit together with said resistor 34; and 35 a resistor which supplies a constant current to the temperature sensor 10 under a constant voltage determined by the Zener diodes 33 and 32. Numeral 36 designates an AND circuit; 30c and 30d input terminals of said AND circuit respectively; and 30e an output terminal of said AND circuit at which a high level output voltage appears only when the input voltages at the input terminals 30c and 30d are concurrently at high levels. Numeral 37 designates a relay, 37a a driving coil of said relay; 37b a movable contact of said relay; and 37c a stationary contact of said relay which is engaged by the movable contact 37b only when a current is conducted through the driving coil 37a. Now, the truth table of the AND circuit 36 is shown in Table 1.

TABLE 1

| Input terminals | | Output terminal |
|---|---|---|
| 30c | 30d | 30e |
| L | L | L |
| L | H | L |
| H | L | L |
| H | H | H |

Numeral 38 designates a NOT circuit whose truth table is shown in Table 2 below:

TABLE 2

| Input terminal | Output terminal |
|---|---|
| 20a | 30d |
| L | H |
| H | L |

Figure 2:
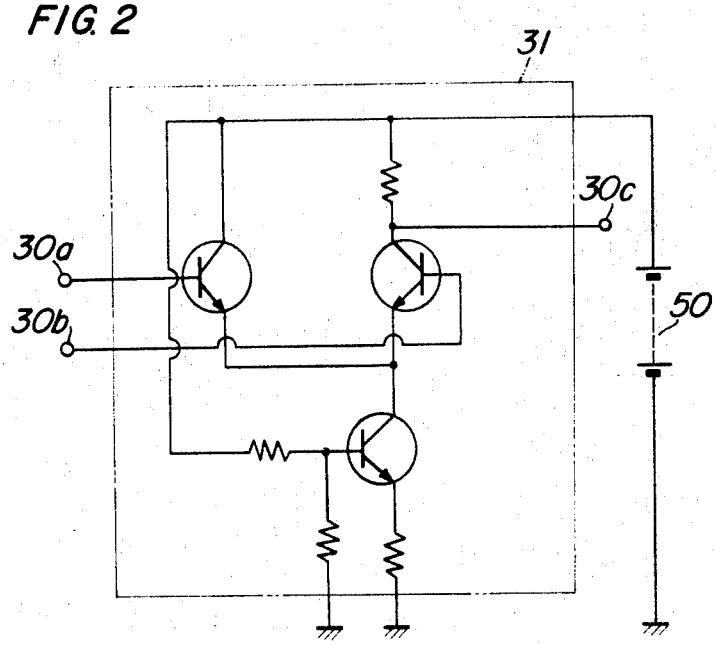
FIG. 2 is an electrical connection diagram showing the internal electric circuit of the comparator amplifier shown in FIG. 1.
Figure 3:
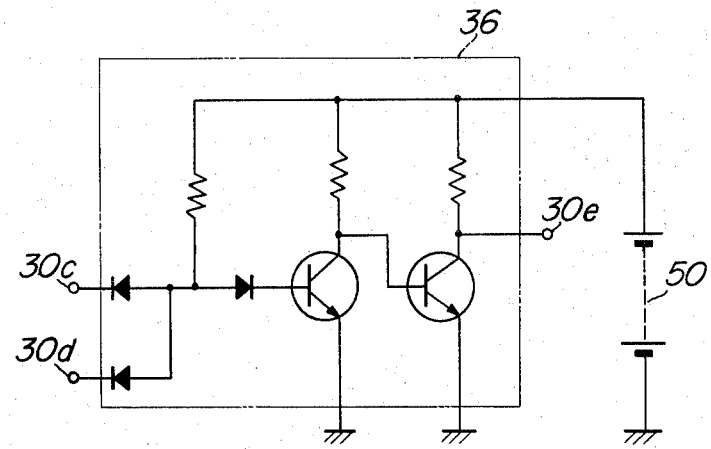
FIG. 3 is an electrical connection diagram showing the internal circuit of the AND circuit shown in FIG. 1.
Figure 4:
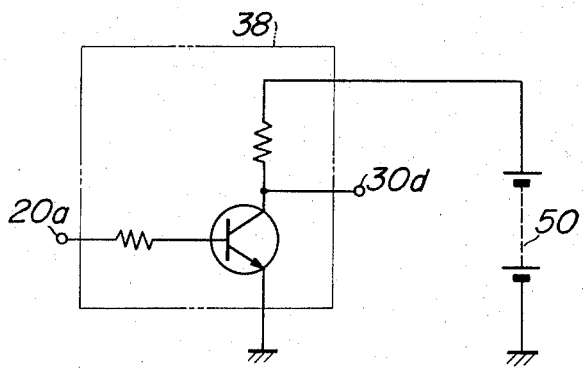
FIG. 4 is an electrical connection diagram showing the internal circuit of the NOT circuit shown in FIG. 1.
Figure 5:
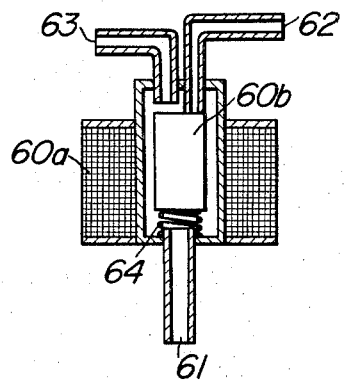
FIG. 5 is a fragmentary vertical sectional view of the three-way valve.

In Tables 1 and 2, symbol H stands for high level and L low level. Numeral 40 generally designates a series D.C. motor to drive an electric fan for cooling the carburetor not shown and fuel (gasoline) supplied to the floating chamber of said carburetor with the external air; 41 the rotor of said motor; and 42 the field winding of said motor. Numeral 44 designates a fan driven by the rotor 41 for concurrently cooling both the carburetor and the fuel passing in a pipe connected to the float chamber of the carburetor. Numeral 20 generally designates a vehicle speed detector; 21 a portion having correlation with the rotation of the vehicle wheels, e.g. a magneto generator connected with an intermediate point of a speedometer cable; 21a the rotor of said generator which consists of a permanent magnet; 21b a stationary winding which generates an A.C. voltage corresponding to the rotational speed of said rotor 21a or the vehicle speed; 22 a rectifying diode for transforming the A.C. voltage generated by said stationary winding 21b into the corresponding D.C. voltage; 23 a smoothing capacitor; 24 a discharge resistor; 25 a Zener diode which is energized when the D.C. voltage generated across the terminals of said resistor 24 or the vehicle speed has reached a predetermined value; and 20a an output terminal of said vehicle speed detector 20. Numeral 50 designates a battery mounted on the vehicle. Numeral 60 generally designates a three-way valve to actuate a directional control valve which selectively communicates an inlet port of an air cleaner, provided to remove dusts from air being sucked into the carburetor, with the inside and outside of the engine room; 60a a driving winding of said three-way vlave which is energized concurrrently with the energization of the motor 40; and 60b a movable core of said three-way valve which is shiftable to introduce either the atmospheric pressure or intake manifold vacuum pressure into a diaphragm means to be described later. The comparator amplifier 31 is constructed as shown in FIG. 2 and its operation will not be described herein as it is well known in the art. The AND circuit 36 is constructed as shown in FIG. 3 and its operation also will not be described herein as it is well known in the art. The NOT circuit is constructed as shown in FIG. 4 and its operation also will not be described herein as it is well known in the art. FIG. 5 shows the construction of the three-way valve 60 as shown, the three-way valve 60 comprises the driving winding 60a, the movable core 60b, a spring 64 cnstantly urging the movable core upwardly, an air pipe 61 constantly open in the atmosphere, a source pipe 62 connected to the intake manifold of the engine to supply the intake manifold vacuum pressure and a load pipe 63 connected to the diaphragm means to be described later, to supply alternately the atmospheric pressure and the manifold vacuum pressure to said diaphragm means and thereby to displace the movable membrane of said diaphragm means. With the construction described above, when the driving winding 60a is not in an energized state, the source pipe 62 is closed, and the load pipe 63 and air pipe 61 are communicated with each other, so that the atmospheric air flows into the valve through said load pipe 63. Now, when the driving winding 60a is energized, the air pipe 61 is closed, and the source pipe 62 and load pipe 63 are communicated with each other, so that the manifold vacuum pressure is supplied into the load pipe 63. FIG. 6 shows the aforesaid diaphragm means which comprises a casing 65, a spring 66, an inlet pipe 64 connected to the load pipe 63 of the three-way valve 60 by a rubber pipe or the like, the movable membrane 67 and a connecting rod 68 to operate a directional control valve (indicated at numeral 81 in FIG. 8) provided in an inlet pipe of an air cleaner. The diaphragm means of the construction described above operates as follows: Namely, when a current is conducted through the driving winding 60a of the three-way valve 60 as stated above, vacuum pressure is applied in the inlet pipe 64, causing the movable membrane 67 to move to the right which is normally urged into its leftward position by the spring 66, and thus the connecting rod 68 connected with said movable membrane is also moved to the right. Consequently, the directional control valve 81 shown in FIG. 8 closes an inlet port 82 of the inlet pipe 80a of the air cleaner 80 and opens an inlet port 83 of said inlet pipe 80a. The inlet port 82 of the inlet pipe 80a is open in the engine room and the other inlet port 83 thereof is open to the outside of the engine room.

The operation of the entire device of this invention, constructed as described above, will be described in the following sequence:

1. When the engine temperature is
    A. low and the vehicle is running at a high speed, for instance, above 40 km/h,
    B. high and the vehicle is running at a high speed.

2. When the engine temperature is
    A. high and the vehicle is running at a low speed, for instance, below 10 km/h,
    B. low and the vehicle is running at a high speed.

Of the heat which heats the carburetor, the heat of hot air blown through the radiator by the engine driven fan is largest and then the heat radiating and transmitted from the engine.

First of all, in the condition (1)-(A) above the temperature of the engine cooling water is relatively low and below 80°C. When the vehicle is running at a high speed above 40 km/h in this case, the air in the interior of the engine room is constantly rapidly exchanged with the outside air and a large quantity of air flows into the engine room from the front side of the radiator, so that the temperature of the air inside the engine room is as low as below 40°C. Since the resistance value of the thermistor 11 is relatively large, the input voltage at the input terminal 30b of the comparator amplifier is higher than at the other input terminal 30a and accordingly the output voltage at the output terminal 30c is low. The output voltage at the output terminal 30e of the AND circuit is similarly low and hence the movable contact 37b and stationary contact 37c of the relay 37 are held in an open state, so that no current is supplied to the series D.C. motor 40 for the electric fan and said electric fan does not operate. This is always the case regardless of whether the voltage level at the other input terminal 30d of the AND circuit is high or low. In this case also, air at a relatively low temperature is flowing around the carburetor as stated above, so that the carburetor temperature does not rise and accordingly carbon carbom monoxide concentration in the exhaust gas does not increase.

In the condition (1)-(B) set forth above or, in other words, when the engine temperature is high and the vehicle is running at a high speed, the temperature of the engine cooling water is heated to 80°–90°C and the engine room temperature rises to about 50°C. In this case, the resistance value of the thermistor 11 falls and, therefore, the voltage at the input terminal 30b of the comparator amplifier 31 is lower than at the other input terminal 30a, and the output voltage at the output terminal 30c becomes high. Since the vehicle is running at a high speed, the voltage across the opposite terminals of the resistor 24 is higher than the Zener voltage of the Zener diode 25. Consequently, the Zener diode 25 is energized and an output voltage appears at the output terminal 20a thereof, so that the output voltage of the NOT circuit falls and accordingly the output voltage at the output terminal 30e of the AND circuit also falls. No current is supplied to the D.C. motor 40 for the electric fan for the same reason as described above and said electric fan does not operate. In this case, air at a temperature slightly higher than in case of the condition (1)-(A) described above is flowing around the carburetor but air rapidly flows inside the engine room, so that the carburetor temperature does not substantially rise and accordingly the carbon monoxide concentration in the exhaust gas does not increase.

Now, when the running speed of the vehicle decreases below about 10 km/h and the condition of (2)-

(A) set forth above occurs, the voltage across the opposite terminal of the resistor 24 falls, deenergizing the Zener diode 25. The output voltage at the output terminal 20a disappears and the output voltage of the NOT circuit increases. Further, in this case, the temperature of the engine cooling water is at 80°–90°C similar to the case of (1)-(B) described above but the quantity of air flowing into the engine room is small as compared with the preceding case as the running speed of the vehicle is low. Therefore, the temperature of air inside the engine room is higher than in the preceding condition and reaches about 70°C. This air temperature gradually rises with the passage of time to about 80°C and even as high as 90°C or higher on some occasions. In this case, the voltage at the input terminal 30b of the comparator amplifier 31 is lower than at the other input terminal 30a, and the voltage at the output terminal 30a becomes high, as in case of the preceding condition. Consequently, the voltage level at the output terminal 30e of the AND circuit rises and the contacts 37b and 37c of the relay 37 are closed, conducting the current to the D.C. motor 40, so that the electric fan 44 is driven by said motor blowing the outside air against the carburetor and concurrently cooling the fuel passing in the pipe to be introduced into the float chamber of said carburetor. At the same time, the current is conducted to the driving winding 60aof the three-way valve 60, so that the movable core 60b of said valve is moved down against the biasing force of the spring 64. The downward movement of the movable core 60b establishes the communication between the source pipe 62 and load pipe 63. As a result, the manifold vacuum pressure is admitted into the diaphragm means through the inlet pipe 54, which causes the movable membrane 67 to displace, so that the connecting rod 68 is moved by said movable membrane 67, causing the directional control valve 81 to make a pivotal movement from the position closing the inlet port 83 of the inlet pipe 80a of the air cleaner to the position to open said inlet port 83 and close the other inlet port 82. Thus, the cold air outside the engine room is supplied to the carburetor and hence into the engine cylinders. In this case, therefore, the temperature of air flowing into the carburetor and the temperatures of the carburetor and the fuel flowing into the float chamber of said carburetor are below about 50°–60°C, even though the temperature of air inside the engine room gradually rises with the passage of time as stated above, and the carbon monoxide concentration in the exhaust gas will not increase. Although the above description is with reference to the case when the vehicle is running at a low speed, it will be obviously understood that the same condition will occur when the vehicle is stationary with the engine idling. When the vehicle is driven at a high speed immediately from such condition and the condition (2)-(B) set forth above is reached, the voltage across the opposite terminals of the resistor 24 increases immediately and the Zener diode 25 is energized. In this case, a voltage appears at the output terminal 20a and the output voltage of the NOT circuit 38 drops, so that the voltage at the output terminal 30e of the AND circuit 36 also drops and the current supply to the electric fan driving D.C. motor 40 is interrupted. The cooling of the carburetor and the fuel admitted into the float chamber of said carburetor is stopped and concurrently the current supply to the driving winding 60a of the three-way valve 60 is also interrupted.

Therefore, the directional control valve 81 is pivoted to close the inlet port 83 of the inlet pipe 80a of the air cleaner 80 and to open the inlet port 82, whereby the air at a relatively high temperature within the engine room is supplied to the carburetor.

The construction and operation of the electric fan will be described with reference to FIG. 7. The electric fan comprises the series D.C. motor 40, input terminals 41a, 42a of said motor 40, a housing 43, an impeller 44 mounted on the rotary shaft of said motor 40, an air discharge port 45 open toward the carburetor, an air inlet port 46 open to the outside of the engine room, and a coil-shaped fuel cooling pipe 47 arranged along the outer periphery of the motor 40 for cooling the gasoline, discharged from a fuel pump and passing therein, with the outside cold air sucked into the motor housing 43 from the air inlet port 46, immediately before said gasoline is admitted into the float chamber of the carburetor. when a current is supplied to the input terminals 41a and 42a, the rotor 41 of the D.C. motor 40 starts rotating, driving the impeller 44. The outside air is sucked into the motor housing 43 from the air inlet port 46 and blown toward the carburetor from the air discharge port 45 to cool said carburetor, during which period the gasoline passing in the coil-shaped cooling pipe is cooled.

FIG. 8 shows the cleaning device of this invention as mounted in the engine room of a vehicle. In FIG. 8, numeral 100 designates the engine room, and the air inlet port 46 of the electric fan is open forwardly outwardly of the vehicle through a front grill 100a. Numeral 70 designates an internal combustion engine, 71 a fuel pump, 72 a cooling fan mounted on the drive shaft of the engine to be driven thereby and 73 a radiator for cooling the engine cooling water with the outside air admitted into the engine room from the front side of said engine room. Numeral 80 designates an air cleaner for filtering dusts entrained in the air being admitted into the engine room, 81 the directional control valve for selectively leading the air into said air cleaner 80, 82 one of the air inlet ports of the air cleaner 80 open in the engine room 100, and 83 the other air inlet port of said air cleaner 80 open to the outside of the engine room for leading the outside cold air into the air cleaner from the front side of the vehicle. Numeral 90 designates the carburetor, 91 the float chamber of said carburetor, 91a a connecting pipe connecting the fuel pump with the coil-shaped cooling pipe 47, and 91b another connecting pipe connecting the cooling pipe 47 with the float chamber 91. Numeral 92 designates a deflector for effectively leading the outside air, discharged from the discharge port 45 of the electric fan 92, toward the carburetor 90 and the float chamber 91 of said carburetor and also for preventing the hot air, heated by the radiator 73, from being directly blown against the carburetor 90 and float chamber 91. The temperature sensor 10 is arranged adjacent the carburetor 90 outside the deflector 92. With the arrangement described above, the fuel in a fuel tank, not shown, when the engine 70 is in operation, is supplied through the connecting pipe 91a, the coil-shaped cooling pipe 47 and the connecting pipe 91b to the float chamber 91 by the fuel pump 71. In this case, the carburetor 90 is heated by the air flow from the fan 72 and the heat radiating and transmitted from the engine. When the electric fan driving D.C. motor 40 is set in motion as stated above, the fuel passing in the coil-shaped cooling pipe 47 is cooled with the outside cold air sucked into the motor housing from the air inlet port 46 and then admitted in the float chamber 91 through the connecting pipe 91b. On the other hand, the outside air discharged from the air discharge port 45 cools the carburetor 90 and the float chamber 91 of said carburetor to prevent both of said carburetor and float chamber from becoming heated.

Concurrently, the directional control valve 81 is operated, whereby the outside cold air in front of the vehicle is led into the air cleaner 80 from the air inlet port 83, instead of the relatively hot air inside the engine room 100 which is normally led into said air cleaner from the air inlet port 82 when the engine room temperature is relatively low, and thus unnecessary and objectional evaporation of the fuel in the carburetor 90 is prevented.

It is to be understood that the present invention is not restricted only to the embodiment described and illustrated herein but many modifications are possible. For instance, the temperature sensor 10 may be located at such a position as to sense the temperature of the hot air from the radiator 73 or to sense the temperature of the casing of the carburetor 90 or the temperature of the fuel in the float chamber 91. It is also to be understood that, although in the embodiment described herein the vehicle speed is detected as the cleaning device is used with an internal combustion engine mounted on a vehicle, an arrangement may be made so as to detect the engine speed. Furthermore, where the passenger compartment of the vehicle is cooled during summer, the air for cooling the motor 40 may be taken from said passenger compartment through the air inlet port 43.

In the present invention, as described above, the cooling means is actuated and the directional control valve is concurrently actuated only when the temperature of the carburetor or the temperature of a portion correlative with said carburetor temperature has risen and reached a predetermined level, to cool the carburetor and the fuel supplied to said carburetor and also to supply cold air to the carburetor from the outside of the engine room. Therefore, by employing the device of this invention it is possible to prevent an increase of carbon monoxide in the exhaust gas and to limit the concentration of carbon monoxide always below a prescribed level when the engine is in its low speed operation and idling phases, which would otherwise occur as a result of the carburetor being heated by the heat radiating from and transmitted to the carburetor from the engine and by the hot air from the engine room, and this is a great contribution to the prevention of atmospheric air pollution.

Furthermore, according to the invention the cooling means and the directional control valve are actuated only when the temperature of the carburetor or the temperature of a portion correlative with said carburetor temperature has reached the set level and the vehicle speed or the engine speed is below a set value (including the case when said vehicle speed is 0 km/h and said engine speed is 0 r.p.m.). This is highly advantageous in preventing excessive discharge of a battery and preventing stoppage of the engine in a cold weather, since the cooling means and directional control valve are actuated just as required and not unnecessarily.

We claim:

1. An exhaust gas cleaning device for internal combustion engines of the type including a carburetor, an air intake for the carburetor, and a fuel line for supplying fuel for the carburetor, comprising a sensor for sensing the temperature of the carburetor or the temperature of a portion correlative with said carburetor temperature and generating an output signal when the sensed temperature has reached above a set value, cooling means comprising an electrically controlled fan connected in circuit with said sensor for cooling said carburetor and fuel being supplied to said carburetor through the fuel line while said electrically controlled fan is receiving the output signal of said sensor, and a directional control valve connected in circuit with said sensor for selectively leading air outside the engine room into the air intake for the carburetor while said directional control valve is receiving the output signal of said sensor.

2. An exhaust gas cleaning device for internal combustion engines, of the type including a carburetor, an air intake for the carburetor, and a fuel line for supplying fuel for the carburetor, comprising a first sensor for sensing the temperature of the carburetor or the temperature of a portion correlative with said carburetor temperature and generating an output signal when the sensed temperature has reached above a set value, a second sensor for sensing the vehicle speed or engine speed and generating an output signal when the sensed speed has reached below a set value, a logical circuit connected in circuit with said first and second sensor for generating an output signal when both of said first and second sensors concurrently generate the output signals, cooling means comprising an electrically controlled fan connected in circuit with said logical circuit for cooling said carburetor and fuel being supplied to said carburetor through the fuel line while said electrically controlled fan is receiving the output signal of said logical circuit, and a directional control valve connected in circuit with said logical circuit for selectively leading air outside of the engine room into the air intake for the carburetor while said directional control valve is receiving the output signal of said logical circuit.

* * * * *